United States Patent
Wyatt

(10) Patent No.: US 9,544,420 B2
(45) Date of Patent: Jan. 10, 2017

(54) METHOD AND SYSTEM FOR ACTIVE CHIP IN A BATTERY

(75) Inventor: Michael A. Wyatt, Clearwater, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/606,368

(22) Filed: Sep. 7, 2012

(65) Prior Publication Data

US 2014/0073297 A1    Mar. 13, 2014

(51) Int. Cl.
| | |
|---|---|
| *H04L 12/58* | (2006.01) |
| *H04M 1/725* | (2006.01) |
| *H04M 1/02* | (2006.01) |
| *H04M 1/656* | (2006.01) |

(52) U.S. Cl.
CPC ....... *H04M 1/72575* (2013.01); *H04M 1/0262* (2013.01); *H04M 1/656* (2013.01); *H04M 2250/10* (2013.01); *H04M 2250/74* (2013.01)

(58) Field of Classification Search
USPC ....... 455/569.2, 577, 404.1, 519; 342/357.1; 340/539.13
See application file for complete search history.

(56) References Cited

U.S. PATENT DOCUMENTS

| | | | |
|---|---|---|---|
| 6,542,758 B1* | 4/2003 | Chennakeshu et al. | ... 455/569.2 |
| 7,123,936 B1* | 10/2006 | Rydbeck et al. | ............ 455/557 |
| 8,547,222 B2* | 10/2013 | Aninye et al. | ........... 340/539.13 |
| 2002/0000930 A1* | 1/2002 | Crowson et al. | .......... 342/357.1 |
| 2005/0239487 A1* | 10/2005 | Glass | .................. H04W 72/005 455/519 |
| 2012/0295575 A1* | 11/2012 | Nam | .......................... 455/404.1 |

FOREIGN PATENT DOCUMENTS

GB      2292287 A  *  2/1996

* cited by examiner

*Primary Examiner* — David Q Nguyen

(74) *Attorney, Agent, or Firm* — Davidson Berquist Jackson & Gowdey, LLP

(57) ABSTRACT

Methods and systems provide an active chip configured for connection to the battery or other component of a host mobile communication device, such as a cellular phone, to thereby add functionality to the host mobile communication device. The system may be installed and used for covert operations (i.e. military and/or law enforcement), adding features such as location tracking and voice recognition and recording to monitor the movement and use of the host mobile device covertly. The system may be used to communicate with other locally enabled systems on a local network instead of communicating through the cellular network, or operate as a radio transceiver or "push-to-talk" device such as a "walkie-talkie." It may be used as a "kid tracker" location tracking device, to find a lost host mobile device, lost person carrying the host mobile device, or track locations where a host mobile device has been.

4 Claims, 2 Drawing Sheets

METHOD AND SYSTEM FOR ACTIVE CHIP IN A BATTERY

This generally relates to mobile device batteries, and more specifically relates to a chip which may be attached to a mobile device battery to augment device performance and feature set.

BACKGROUND

Conventional mobile device batteries, such as the battery of a smartphone (i.e. the Blackberry by Motorola, Inc.), are contained in a separate battery compartment, normally located on the back of the host mobile device. Conventional mobile device batteries provide one feature to the host mobile device—a power source.

Conventional mobile device batteries are connected to the host mobile device via a series of battery connectors within the host mobile device's battery compartment and a corresponding series of battery connectors on the surface of the battery. In a conventional cellular telephone, the battery connectors are typically "plus wires" and "minus wires"—connections utilized for sending power from the battery to the cellular telephone. Conventional smartphones may instead utilize smart batteries. In these applications, the set of battery connectors may further comprise data connections allowing for transmission of information from the battery to the smartphone, for example the amount of battery power used by certain applications.

Conventional mobile devices may contain a set of enhancement features and/or applications. These features and/or applications may provide a map function with or without mobile device location information gleaned from the global positioning system ("GPS"), voice recording, and/or data encryption. However, at least some of these functions and/or applications require the mobile device to establish a connection to the cellular network for operability. Further, it is easy for the user of a conventional mobile device to know when the user's mobile device is running any or all of these features and/or applications, making it difficult for a third party to clandestinely run features and/or applications on a mobile device.

Accordingly, there is a desire for a solution to these and other related problems.

SUMMARY

In accordance with methods and systems consistent with the present invention, a data processing system is provided for augmenting functionality of a mobile communication device, comprising a removable battery configured to power the mobile communication device. The data processing system also comprises an integrated circuit attached to the removable battery and configured to add one or more additional functions to the mobile communication device.

In one implementation, a data processing system is provided for augmenting functionality of a mobile communication device, comprising a removable SIM (Subscriber Identification Module) card configured to identify a subscriber to the mobile communication device, and an integrated circuit attached to the removable SIM card and configured to add one or more additional functions to the mobile communication device.

In another implementation, a data processing system is provided for augmenting functionality of a mobile communication device, comprising an integrated circuit attachable to a removable battery configured to power the mobile communication device, wherein the integrated circuit is configured to add one or more additional functions to the mobile communication device.

In yet another implementation, a method is provided in a data processing system for augmenting functionality of a mobile communication device, comprising attaching an integrated circuit to a removable battery and configured to add one or more additional functions to the mobile communication device. The method further comprises plugging the removable battery configured to power the mobile communication device into the mobile communication device.

DETAILED DESCRIPTION

Methods and systems in accordance with the present invention provide an active chip configured for connection to the battery or other component of a host mobile communication device to thereby add functionality to the host mobile communication device. This system includes an active chip with the desired functionality installed thereon. This active chip acts as a substrate to a conventional mobile device battery or other component of a host mobile device. In one implementation, the system may be installed and used for covert operations (i.e. military and/or law enforcement), adding features such as location tracking and voice recognition and recording to allow the military and/or law enforcement authorities to monitor the movement and use of the host mobile device covertly. In another implementation, the system may be installed and used to communicate with other locally enabled systems on a local network instead of communicating through the cellular network, or operate as a radio transceiver or "push-to-talk" device such as a "walkie-talkie." The system may be installed and used as a tethering or "kid tracker" location tracking device, enabling the user to find a lost host mobile device, lost person carrying the host mobile device, or track locations where a host mobile device has been.

Figure 1:
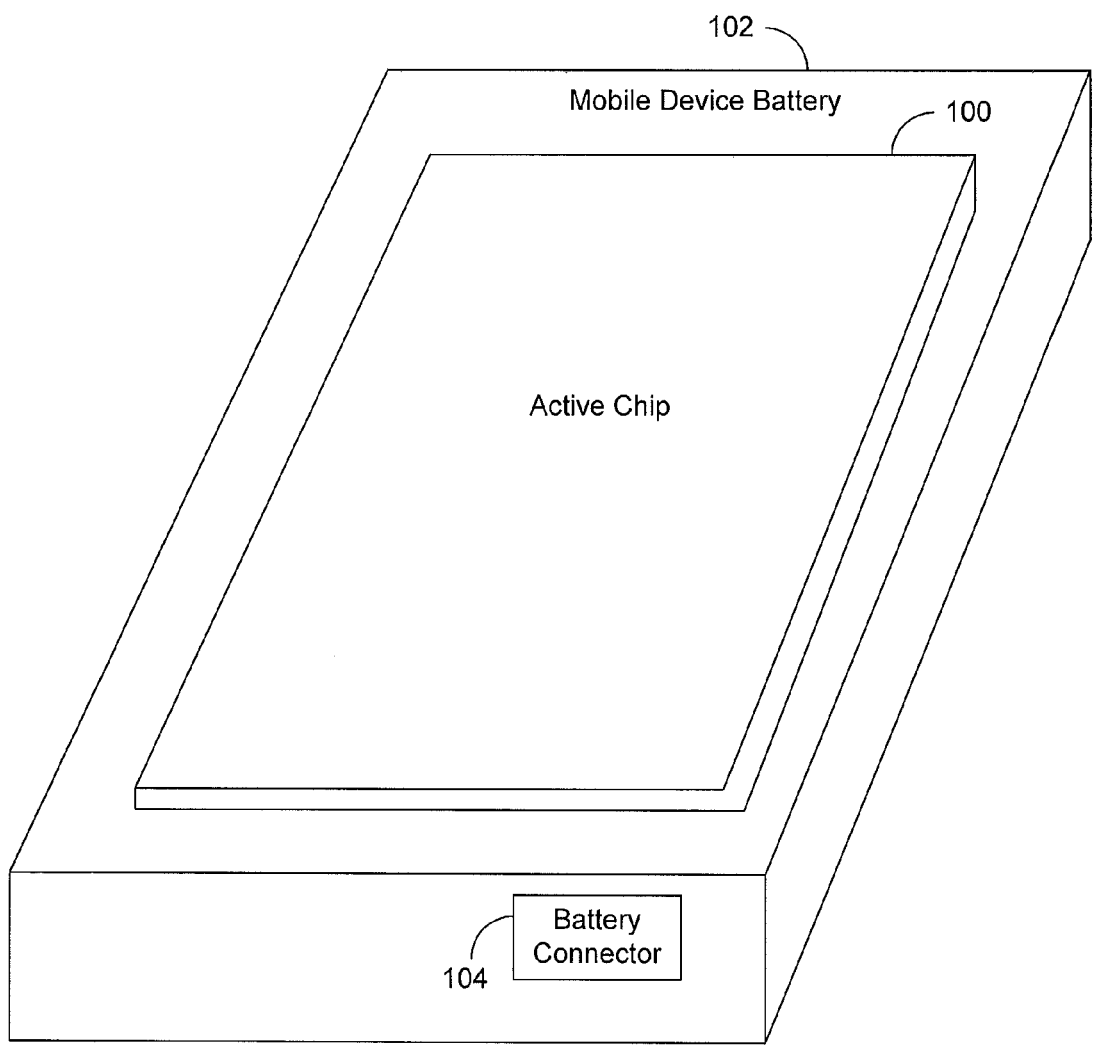
FIG. 1 illustrates an exemplary embodiment of an active chip for mobile device modification in accordance with methods and systems consistent with the present invention.

FIG. 1 illustrates an exemplary embodiment of an active chip for mobile device modification in accordance with methods and systems consistent with the present invention. Active Chip 100 comprises a thin substrate configured for connection to Mobile Device Battery 102. Connection of Active Chip 100 to a mobile device battery is one embodiment and shown by way of example. In other implementations, Active Chip 100 may instead be connected to another mobile device component (i.e. a SIM card or an SD card). Active Chip 100 is configured to perform the functionality the user desires to add to the host mobile device. In some implementations, the Mobile Device Battery 102 or other mobile device component may be manufactured with the Active Chip 100 included. Whether manufactured with it or added later, this would facilitate covert use of methods and systems in accordance with the present invention is facilitated by allowing Active Chip 100 to be added to a host mobile device, such as a cellular phone, by swapping out the existing battery or other mobile device component for the one with the active chip 100, rather than requiring the user to add Active Chip 100 to Mobile Device Battery 102 or other mobile device component in real time. In other implementations, addition of the Active Chip 100 to Mobile Device Battery 102 or other mobile device component may occur post-production. In some implementations, Active Chip 100 may be concealed from plain sight after connection to Mobile Device Battery 102 or other mobile device component by a cover, facilitating covert use of methods and systems in accordance with the present invention.

Battery Connector 104 comprises the connection point for connecting Mobile Device Battery 102 to the host mobile device. Battery Connector 104 may comprise electrical connections for transmitting power from Mobile Device Battery 102 to the host mobile device. Battery Connector 104 may also comprise data connections for transmitting data from Mobile Device Battery 102 to the host mobile device. In some implementations, Active Chip 100 may be connected to Mobile Device Battery 102 through Battery Connector 104. In some implementations, this physical connection my allow Active Chip 100 to access internal phone features and to draw power for its operation from Mobile Device Battery 102. Further, some mobile devices include Bluetooth capability, which would allow Active Chip 100 to communicate with the mobile device via Bluetooth. In other implementations where Active Chip 100 is connected to another mobile device component (i.e. a SIM card or an SD card), Active Chip 100 would be connected to the host mobile device and receive power through the connector for the other mobile device component (i.e. the SIM card connector or SD card connector). In such implementations, Active Chip 100 may also gain access to features and functions inherent in the other mobile device component. For example, if Active Chip 100 were connected to an SD card, the user of the Active Chip 100 may gain access to data stored on the SD card.

Figure 2:
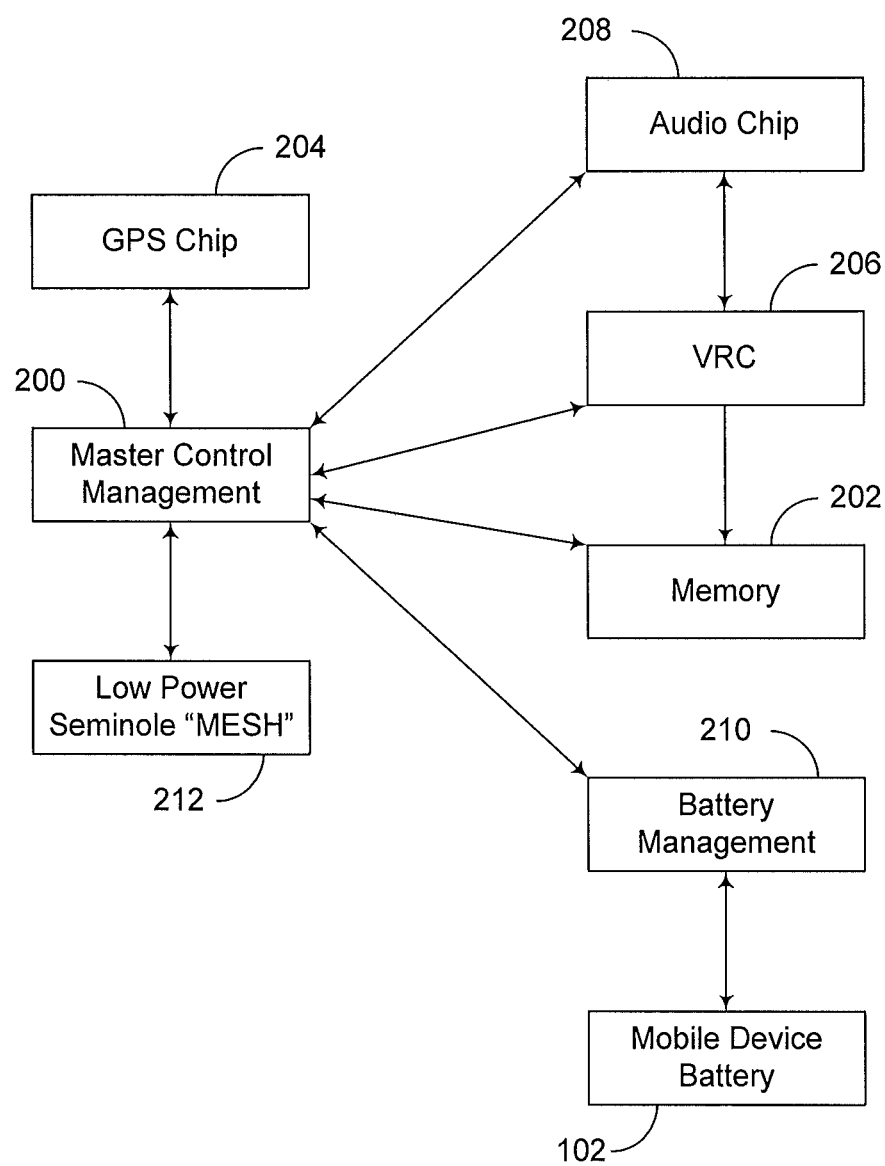
FIG. 2 illustrates a flow chart depicting components and potential functionalities included in an exemplary embodiment of an active chip for mobile device modification in accordance with methods and systems consistent with the present invention.

FIG. 2 illustrates a flowchart depicting components and potential functionalities included in an exemplary embodiment of an active chip for mobile device modification in accordance with methods and systems consistent with the present invention. Master Control Management 200 is a processor for executing and coordinating the functionality of Active Chip 100. Memory 202 is a quantity of data memory for data storage. In some implementations, Memory 202 may store software encryption data transmitted between Active Chip 100 and the host mobile device for security of Active Chip 100. In some implementations, Memory 202 may store mission details of the mission requiring use of Active Chip 100. In still further implementations, Memory 202 may store data collected by Active Chip 100, including GPS data and voice recordings.

GPS Chip 204 is a GPS chip which allows the user of Active Chip 100 to track the location of the host mobile device. GPS Chip 204 may allow the user of Active Chip 100 to track the location of the host mobile device, for example to enable the tethering or "kid finder" use of Active Chip 100. VRC 204 is voice recognition circuitry. VRC 206 recognizes the presence of human voices and activates the voice recording functionality of Active Chip 100 only when a human voice is present. In this way, extensive Mobile Device Battery 102 power use can be avoided. Further, VRC 206 allows conservation of Memory 202, whereas without VRC 206 the voice recording functionality would be constantly on and Memory 202 would become full of data quicker. Audio Chip 208 is an audio chip (i.e. the ADMP421 chip by Analog Devices, Inc.) for recording audio data. The ADMP421 chip utilizes an integrated microphone on the chip. In other implementations utilizing a different Audio Chip 208, an external microphone may be employed.

Battery Management 210 is the battery management tool of the host mobile device. The connection of Master Control Management 200 to Battery Management 210 allows Active Chip 100 to draw power from the host mobile device. Further, in some implementations, this connection may allow Master Control Management 200 to access data transmitted from Mobile Device Battery 102 to the host mobile device.

Seminole MESH 212 is a networkable transceiver which allows the Active Chip 100 to form a network and communicate with other transceivers. In some implementations, Seminole MESH 212 may be a low power transceiver in order to minimize consumption of power from Mobile Device Battery 102. Use of Seminole MESH 212 enables the host mobile device to communicate with other devices on the same network without requiring connection to the cellular network. In this way, the host mobile device may acquire the ability to communicate directly with other mobile devices when the cellular network is disabled or unavailable (as in a "push-to-talk" device or "walkie-talkie").

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A data processing system for augmenting functionality of a mobile communication device, comprising:
   a removable battery configured to power the mobile communication device; and
   an integrated circuit attached to the removable battery, detachable from the removable battery and configured to add one or more additional functions to the mobile communication device,
   wherein the one or more additional functions comprises providing voice recognition to recognize any human voice and recording voice on the mobile communication device only when one or more human voices are recognized, wherein the integrated circuit is detachable from the removable battery.

2. A data processing system for augmenting functionality of a mobile communication device, comprising:
   a removable battery configured to power the mobile communication device; and
   an integrated circuit attached to the removable battery, detachable from the removable battery and configured to add one or more additional functions to the mobile communication device;
   wherein the integrated circuit further comprises a GPS circuit, and wherein the location of the mobile communication device is tracked using GPS, and
   wherein the one or more additional functions comprises providing the location of the mobile communication device and recording locations of the mobile communication device as the mobile communication device moves.

3. A data processing system for augmenting functionality of a mobile communication device, comprising:
   an integrated circuit attachable to and detachable from a removable battery configured to power the mobile communication device, wherein the integrated circuit is configured to add one or more additional functions to the mobile communication device, wherein the one or more additional functions comprises providing voice recognition to recognize a any human voice and recording voice on the mobile communication device only when one or more human voices are recognized.

4. A method in a data processing system for augmenting functionality of a mobile communication device, comprising:

attaching an integrated circuit to a removable battery and configured to add one or more additional functions to the mobile communication device, wherein the integrated circuit is detachable from the removable battery; and plugging the removable battery configured to power the mobile communication device into the mobile communication device, wherein the one or more additional functions comprises providing voice recognition to recognize any human voice and recording voice on the mobile communication device only when one or more human voices are recognized.

* * * * *